(12) United States Patent
Klassen et al.

(10) Patent No.: US 10,261,654 B2
(45) Date of Patent: Apr. 16, 2019

(54) HANDHELD ELECTRONIC DEVICE AND ASSOCIATED METHOD FOR INDICATING DELIVERY STATUS OF A MESSAGE

(71) Applicant: BlackBerry Limited, Waterloo (CA)

(72) Inventors: Gerhard Dietrich Klassen, Waterloo (CA); Christopher R. Wormald, Kitchener (CA); Darcy R. Phipps, Waterloo (CA); Craig A. Dunk, Guelph (CA)

(73) Assignee: BlackBerry Limited, Waterloo, Ontario (CA)

( * ) Notice: Subject to any disclaimer, the term of this patent is extended or adjusted under 35 U.S.C. 154(b) by 267 days.

(21) Appl. No.: 14/159,170

(22) Filed: Jan. 20, 2014

(65) Prior Publication Data

US 2014/0137000 A1 May 15, 2014

Related U.S. Application Data

(63) Continuation of application No. 11/962,145, filed on Dec. 21, 2007, now Pat. No. 9,098,169, which is a
(Continued)

(51) Int. Cl.
*G06F 3/0481* (2013.01)
*H04L 12/58* (2006.01)
(Continued)

(52) U.S. Cl.
CPC .......... *G06F 3/04817* (2013.01); *H04L 51/04* (2013.01); *H04L 67/24* (2013.01); *H04L 69/24* (2013.01); *H04W 4/16* (2013.01)

(58) Field of Classification Search
CPC ...... G06F 3/04817; H04W 4/16; H04L 51/04; H04L 12/581; H04L 67/24; H04L 69/24
(Continued)

(56) References Cited

U.S. PATENT DOCUMENTS 5,444,761 A 8/1995 Nagashima
5,515,366 A 5/1996 Chieu et al.
(Continued)

FOREIGN PATENT DOCUMENTS

EP 1009153 A1 6/2000
EP 1176840 A1 1/2002
(Continued)

OTHER PUBLICATIONS

Non-Final Office Action dated Dec. 1, 2014, received for U.S. Appl. No. 11/962,145.
(Continued)

*Primary Examiner* — Roland J Casillas
(74) *Attorney, Agent, or Firm* — Jeffrey N. Giunta; Fleit Gibbons Gutman Bongini & Bianco P.L.

(57) ABSTRACT

An improved handheld electronic device and an associated method are provided in which enhanced information regarding an "availability" of a user of a handheld electronic device is provided to another electronic device in a messaging environment. Such availability data provides stepwise indications of the relative availabilities of one or more users of electronic devices in a messaging environment. The step-wise indications can, for instance, range from an availability level of "currently active" to several levels of non-availability. The device and method can be incorporated into an existing messaging environment.

23 Claims, 4 Drawing Sheets

Related U.S. Application Data continuation-in-part of application No. 10/942,305, filed on Sep. 16, 2004, now Pat. No. 7,315,747.

(60) Provisional application No. 60/503,367, filed on Sep. 16, 2003, provisional application No. 60/503,366, filed on Sep. 16, 2003.

(51) Int. Cl.
*H04L 29/08* (2006.01)
*H04L 29/06* (2006.01)
*H04W 4/16* (2009.01)

(58) Field of Classification Search
USPC .......................................................... 715/753
See application file for complete search history.

(56) References Cited

U.S. PATENT DOCUMENTS

| | | |
|---|---|---|
| 5,793,365 A | 8/1998 | Tang et al. |
| 5,802,460 A | 9/1998 | Parvulescu et al. |
| 5,960,173 A | 9/1999 | Tang et al. |
| 6,301,609 B1 | 10/2001 | Aravamudan et al. |
| 6,317,593 B1 | 11/2001 | Vossler |
| 6,519,639 B1 | 2/2003 | Glasser et al. |
| 6,539,421 B1* | 3/2003 | Appelman ............ G06Q 10/107 709/206 |
| 6,564,261 B1 | 5/2003 | Gudjonsson et al. |
| 6,577,859 B1 | 6/2003 | Zahavi et al. |
| 6,606,309 B1 | 8/2003 | Wang |
| 6,856,603 B1* | 2/2005 | Vollmer ............ H04W 52/0216 370/311 |
| 7,035,865 B2 | 4/2006 | Doss et al. |
| 7,139,797 B1 | 11/2006 | Yoakum et al. |
| 7,236,472 B2 | 6/2007 | Lazaridis |
| 7,315,747 B2 | 1/2008 | Klassen et al. |
| 7,911,987 B2 | 3/2011 | Lazaridis et al. |
| 8,345,601 B2 | 1/2013 | Lazaridis et al. |
| 2001/0041590 A1 | 11/2001 | Silberfenig et al. |
| 2002/0042808 A1* | 4/2002 | Smith .................... G06Q 10/10 718/1 |
| 2002/0075303 A1* | 6/2002 | Thompson ............ G06F 3/0481 715/751 |
| 2002/0087649 A1 | 7/2002 | Horvitz |
| 2002/0126146 A1* | 9/2002 | Burns .................... G06F 3/0481 715/752 |
| 2002/0128036 A1 | 9/2002 | Yach et al. |
| 2002/0143916 A1 | 10/2002 | Mendiola et al. |
| 2003/0013467 A1 | 1/2003 | Caloud |
| 2003/0018726 A1 | 1/2003 | Low et al. |
| 2003/0065721 A1 | 4/2003 | Roskind |
| 2003/0126213 A1 | 7/2003 | Betzler |
| 2003/0217098 A1 | 11/2003 | Bobde et al. |
| 2004/0117443 A1* | 6/2004 | Barsness ................ G06Q 10/10 709/204 |
| 2004/0162877 A1* | 8/2004 | Van Dok ............... G06F 3/0481 709/204 |
| 2004/0170263 A1 | 9/2004 | Michael et al. |
| 2005/0027716 A1 | 2/2005 | Apfel |
| 2006/0101266 A1 | 5/2006 | Klassen et al. |
| 2007/0042815 A1 | 2/2007 | Trap |
| 2008/0082620 A1* | 4/2008 | Barsness ................ G06Q 10/10 709/207 |
| 2008/0261636 A1 | 10/2008 | Lau et al. |

FOREIGN PATENT DOCUMENTS

| | | |
|---|---|---|
| EP | 1233570 A1 | 8/2002 |
| EP | 1331786 A1 | 7/2003 |
| EP | 1385323 A1 | 1/2004 |
| WO | WO 99/12365 A1 | 3/1999 |
| WO | WO 02/065250 A2 | 8/2002 |
| WO | WO 03/034672 A1 | 4/2003 |
| WO | WO 03/058908 A2 | 7/2003 |

OTHER PUBLICATIONS

Hiroyuki I.; Takeshi S.; Suguru Y.; Yuji O.; "Webhint: An Automatic Configuration Mechanism for Optimizing World Wide Web Cache System Utilization"; Proceedings of the 1998 Internet Society Conference (INET'98); Jul. 21, 1998.
Squid Developers; "Squid Programmers Guide"; internet article [online] Aug. 11, 2004; retrieved on Aug. 1, 2006 from http://www.squid-cache.org/Doc/Prog-Guide/.
Vetter, B. et al.; "An Experimental Study of Insider Attacks for the OSPF Routing Protocol"; 1997; pp. 1 to 17; ICN.
Acampora, A.S. et al.; "Control and Quality-of-Service Provisioning in High-Speed Microcellular Networks"; IEEE Personal Communications Magazine; 1994; vol. 1, No. 2.
Tanembaum, A.; Computer Networks (Fourth Edition); Jan. 1, 2003; p. 7; ISBN: 978-0-13-038488.
Lastoria, G.; Supplementary Search Report from European Application No. 04761845.9; search completed Aug. 22, 2006.
Lastoria, G.; Supplementary Search Report from European Application No. 04761846.7; search completed Aug. 24, 2006.
Lastoria, G.; Search Report from European Application No. 04761847.5; search completed Oct. 11, 2006.
Lastoria, G.; Search Report from European Application No. 08166369.2; search completed Mar. 12, 2009.
Lastoria, G.; Search Report from European Application No. 10156600.8; search completed Apr. 20, 2010.
Lastoria, G.; Search Report from European Application No. 10178664.8; search completed Oct. 14, 2010.
Lastoria, G.; Search Report from European Application No. 10184719.2; search completed Nov. 24, 2010.

* cited by examiner

HANDHELD ELECTRONIC DEVICE AND ASSOCIATED METHOD FOR INDICATING DELIVERY STATUS OF A MESSAGE

CROSS-REFERENCE TO RELATED APPLICATIONS

This application is a continuation of U.S. Utility patent application Ser. No. 11/962,145, filed Dec. 21, 2007, entitled Handheld Electronic Device and Associated Method Providing Availability Data in a Messaging Environment, which is a continuation in part of U.S. Utility patent application Ser. No. 10/942,305, filed Sep. 16, 2004, entitled Electronic Device and Associated Method Providing Availability Data in a Messaging Environment, (now U.S. Pat. No. 7,315,747, issued Jan. 1, 2008) which application claims the benefit of U.S. Provisional Application No. 60/503,367 entitled "A Method for Creating a Peer-to-Peer Quick Messaging Solution Without Using an Instant Messaging Server," which was filed on Sep. 16, 2003, and U.S. Provisional Application No. 60/506,366 entitled "Activity Proxying Presence in Mobile Instant Messaging," which was filed on Sep. 16, 2003. The disclosure of U.S. Provisional Application No. 60/503,367 and the disclosure of U.S. Provisional Application No. 60/506,366 are hereby incorporated into the present application by reference.

BACKGROUND OF THE INVENTION

Field of the Invention

The invention relates generally to handheld electronic devices and, more particularly, to a handheld electronic device and a method and protocol for providing information representative of an availability of a user in a messaging environment.

Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also feature wireless communication capability, although many such handheld electronic devices are stand-alone devices that are functional without communication with other devices. With advances in technology, handheld electronic devices are being configured to include greater numbers of features while having relatively smaller form factors.

Electronic devices, including handheld electronic devices, are capable of numerous types of communication. One type of communication is "messaging", and one type of messaging is "instant messaging" which enables a first device to send a message to a second device. Many instant messaging services, both public and private, are available today. With most all instant messaging services, a given electronic device is provided with an interface that identifies various other electronic devices with which the given electronic device can communicate. If one of the other electronic devices has been logged out of the instant messaging service or has been switched off, the interface typically will identify the "presence" of such electronic device as being "unavailable". Otherwise, the other electronic devices are listed as having a "presence" of "available" unless a user of one of the other electronic devices has manually changed his or her presence to a different setting, such as "out to lunch". While instant messaging protocols and devices using the protocols have been generally effective for their intended purposes, such instant messaging protocols and devices have not been without limitation.

Generally, all instant messaging services employ protocols that were written for desktop devices, i.e., devices that generally are not portable. In an environment that includes handheld electronic devices, i.e., devices that are portable and generally remain switched on, the old protocol presence designations of "available" and "unavailable" are imprecise since such a handheld electronic device is nearly always listed as "available", even late at night when a user clearly is not available, say, for instant messaging. Such an imprecise indication of a user's availability is generally undesirable in a messaging environment since it is generally desired that a recipient of a message be available to read and respond to the message. The communication of messages to an unavailable user wastes the time of the sender of the messages and also wastes communication bandwidth. It thus would be desirable to provide an improved method and apparatus for providing more accurate information regarding the availability of a user of a handheld electronic device in a messaging environment. Such an improved method and apparatus desirably might be capable of use with existing instant messaging services.

SUMMARY OF THE INVENTION

An improved handheld electronic device and an associated method are provided in which enhanced information regarding an "availability" of a user of a handheld electronic device is provided to another electronic device in a messaging environment. Such availability data provides stepwise indications of the relative availabilities of one or more users of electronic devices in a messaging environment. The step-wise indications can, for instance, range from an availability level of "currently active" to several levels of non-availability. The device and method can be incorporated into an existing messaging environment.

Accordingly, an aspect of the invention is to provide an improved handheld electronic device, a messaging method, and a protocol in which a relatively descriptive indication of a user's availability in a messaging environment is provided to other users in the environment.

Another aspect of the invention is to provide an improved method of helping users of a messaging service to communicate with other users by having an awareness of the relative availabilities of the other users of handheld electronic devices for messaging.

Another aspect of the invention is to provide an improved method of helping users of a messaging service to reduce the amount of time that otherwise is wasted in attempting to communicate with other users of the messaging service by providing an indication as to whether or not the other users are likely to respond to messages.

Another aspect of the invention is to provide an improved method of reducing wasted bandwidth in a messaging environment by reducing the number of sent messages that are unlikely to receive a response from another user.

Another aspect of the invention is to provide an improved handheld electronic device, a messaging method, and a protocol in which a relatively descriptive indication of a user's availability in a messaging environment is provided to other users in the environment and that can be incorporated, at least in part, into an existing messaging service.

Accordingly, an aspect of the invention is to provide an improved method of enabling communication of enhancement data between a first device and a second device, with the first device being a handheld electronic device having a wireless communication capability, and with the second device being an electronic device. The first device and the second device are capable of communication with one another in a first communications band. The general nature of the method can be stated as including enabling a communication between the first device and the second device in a second communications band, and enabling a transmission of enhancement data between the first device and the second device in the second communications band.

Another aspect of the invention is to provide an improved method of enabling communication of enhancement data between a first device and a second device, with the first device being a handheld electronic device having a wireless communication capability, and with the second device being an electronic device. The general nature of the method can be stated as including enabling a communication between the first device and the second device, enabling a determination responsive to said communication that the first device and the second device are capable of communicating enhancement data, and enabling a transmission of enhancement data between the first device and the second device.

BRIEF DESCRIPTION OF THE DRAWINGS

A full understanding of the invention can be gained from the following Description of the Preferred Embodiment when read in conjunction with the accompanying drawings in which.

Similar numerals refer to similar parts to the specification.

DESCRIPTION OF THE PREFERRED EMBODIMENT

Figure 1:
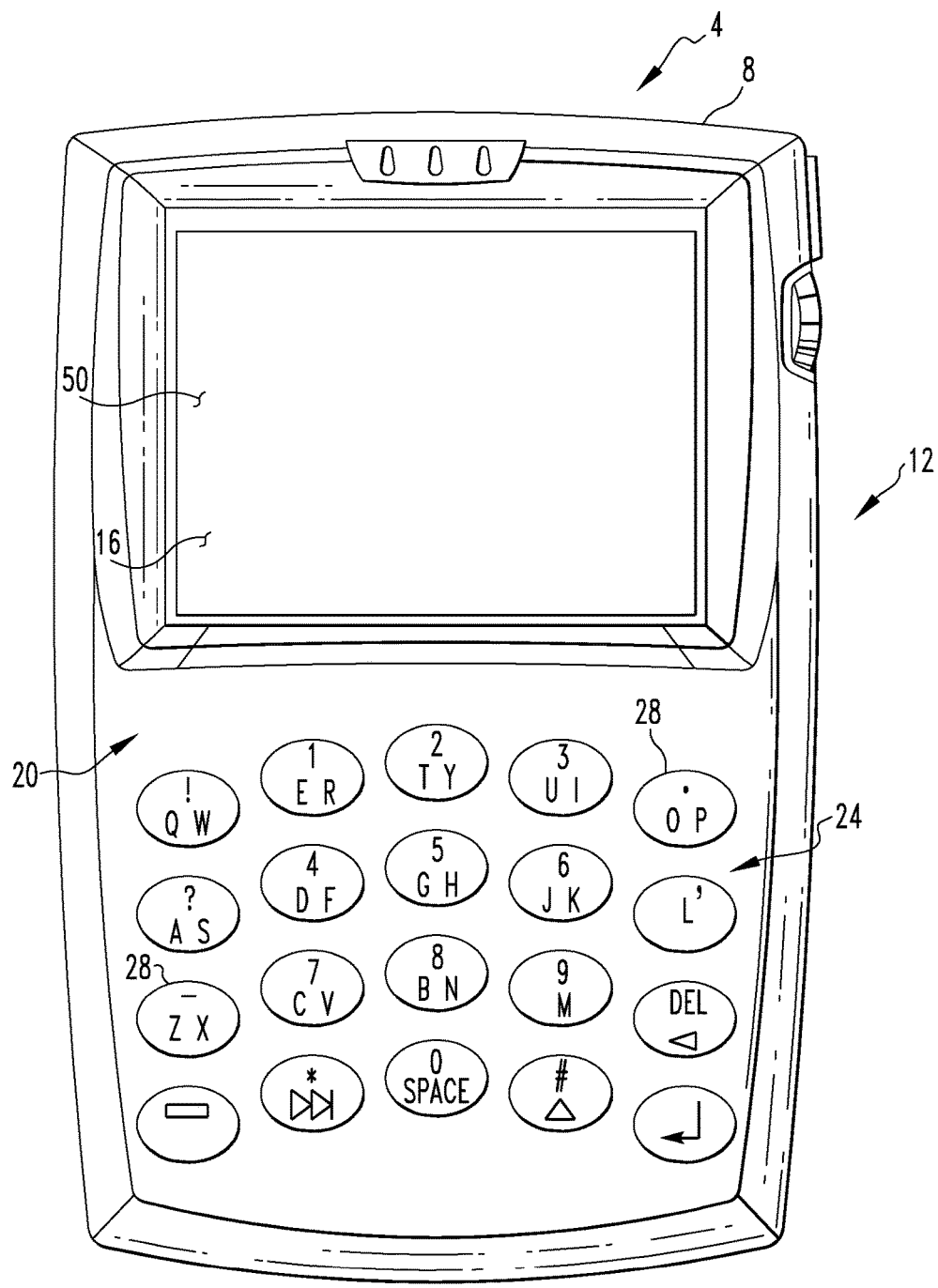
FIG. 1 is an exemplary top plan view of a handheld electronic device in accordance with the invention which can be used in conjunction with an improved method in accordance with the invention.
Figure 2:
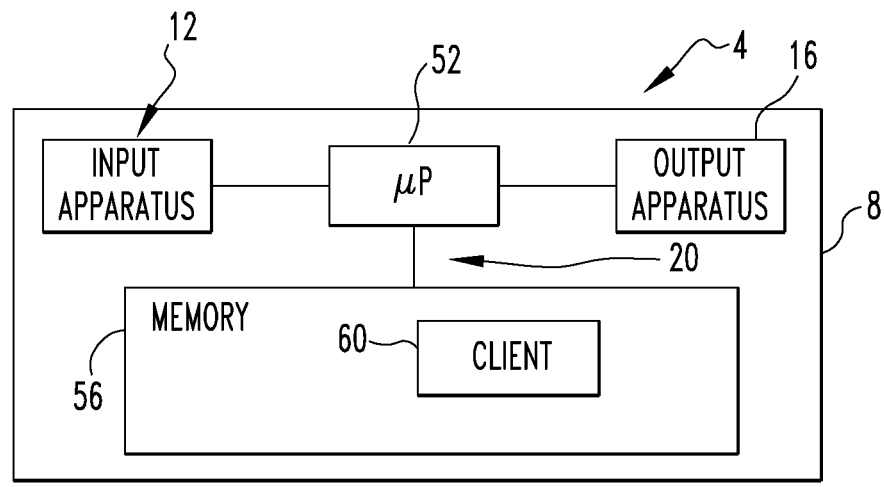
FIG. 2 is a schematic view of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28.

The output apparatus 16 includes a display 50. The output apparatus 16 can additionally include, for instance, additional indicators such as lights, and the like, and can additionally include an audible output such as a speaker as well as other output devices.

The processor apparatus 20 includes a processor 52 that can be, for instance, and without limitation, a microprocessor (µP), and it is responsive to inputs from the input apparatus 12 and provides output signals to the output apparatus 16. The processor apparatus 20 further includes a memory 56 that includes a client 60 stored therein. The exemplary client 60 is a messaging routine that can provide a messaging capability on the device 4. It is understood that the memory 56 likely includes a number of other routines that are not expressly mentioned herein. As employed herein, the expression "a number of" and variations thereof shall refer broadly to any nonzero quantity including a quantity of one. The processor 52 interfaces with the memory 56, and the client 60 is executable on the processor 52. A more detailed discussion of the generation and provision of availability information is provided in commonly owned U.S. patent application Ser. Nos. 10/942,749 and 10/942,167 filed on Sep. 16, 2004, entitled "Handheld Electronic Device and Associated Method Providing Availability Data in a Messaging Environment"; and entitled "A Method For Creating A Peer-To-Peer Immediate Messaging Solution Without Using An Instant Messaging Server", the disclosures of which are hereby incorporated into the present application by reference.

Figure 3:
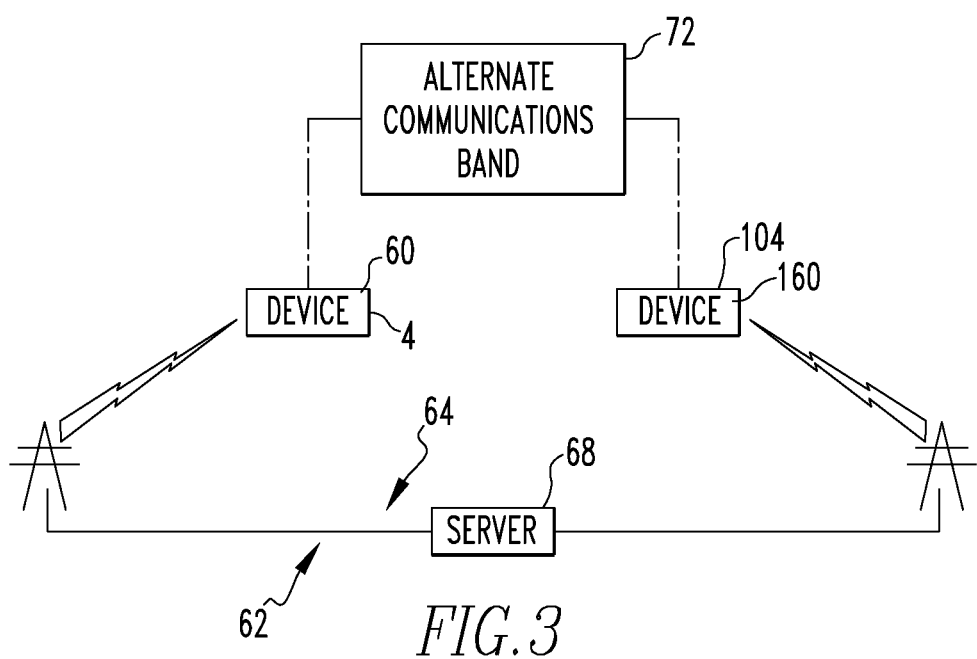
FIG. 3 is a schematic view of the handheld electronic device of FIG. 1 and another device in a messaging environment.

The device 4 further includes a wireless communication system. As can be seen in FIG. 3, the device 4 and, more specifically, the client 60 can interface with a messaging service 62 to wirelessly provide the messaging capability on the device 4. In the depicted exemplary embodiment, the messaging service 62 provides an instant messaging capability on the device 4 and on the other electronic devices having clients that are subscribers to the messaging service 62. The messaging service 62 is schematically depicted as including a server 68 and as providing communication within a first communication band 64. The first communication band 64 can generally be said to include the preexisting protocol of the messaging service 62 as transmitted through the predetermined communication bandwidth through which the messaging service 62 is provided to its subscribers.

FIG. 3 further depicts another device 104 as being a device having a client that is another subscriber to the messaging service 62. Specifically, the device 104 is an electronic device having a client 160 thereon which can communicate with the messaging service 62 to provide a messaging capability on the device 104. While the exemplary device 104 is depicted as having a wireless connection with the messaging service 62, it is understood that the device 104 may employ a non-wireless communication capability and still not depart from the concept of the invention. It is further understood that while only the two devices 4 and 104 are depicted in FIG. 3 as being subscribers to the messaging service 62, many more subscribers to the messaging service 62 exist but are not expressly depicted in FIG. 3.

In accordance with an aspect of the improved method of the invention, the protocol of the messaging service 62, as provided on the devices 4 and 104 by the clients 60 and 160, respectively, provides to users of the devices 4 and 104 enhanced data regarding the likely availability of the other users of the other devices that are subscribers to the messaging service 62. That is, a user of a device 4, 104 having a client 60, 160 that is a subscriber to the messaging service 62 can receive enhanced data regarding the likely availability of the other subscribers to the messaging service 62 with which the user has already developed some type of electronic relationship. The data regarding availability can, for example, be in a stepped form that provides discrete levels of availability. Other formats for the availability data can be provided without departing from the concept of the invention.

For example, the stepped availability of a user of a device 4 can be represented by, for instance, a level from among a plurality of levels of availability and a plurality, for instance, of levels of nonavailability, depending upon the configuration of the device 4 and the client 60 thereon. The device 4 may, for instance, include a telephone capability, an e-mail capability, an organizer/calendar capability, a wireless point-to-point communication capability such as provided by the Bluetooth protocol or other protocol, an instant messaging capability, a push-to-talk communication capability, and/or many other capabilities. The detected degree of usage of the device 4 and/or of the various capabilities of the device 4 can be employed to generate the availability data which is reflective of an availability at any given time of a user of the device 4.

In the present exemplary embodiment 104, the availability data can be at any of six levels of availability, i.e., A(1), A(2), A(3), A(4), A(5), and A(6), with A(6) being the highest level of availability, or at any of three levels of nonavailability, i.e., and for example, "suspend", "unavailable", and "offline". Each such level can have a general description of the corresponding activity status on a device such as is provided in Table 1.

TABLE 1

| Availability Level | General Description of Activity Status |
|---|---|
| A(6) | Currently active on messaging application, i.e., client |
| A(5) | Currently actively using device |
| A(4) | Sporadically using device |
| A(3) | Less frequent device use |
| A(2) | Infrequent device use |
| A(1) | No recent device use |
| Suspend | On phone or on data call |
| Unavailable | Device unreachable (for instance, powered off or out of coverage) |
| Offline | Not logged into messaging service or client, or user is blocked. |

As a general matter, the "availability" of a user of a device 4 can be determined in a general fashion, or at least estimated, from the particular activity status of the device 4. For instance, if a user is actively using the messaging client 60 on the device 4, such as would correspond with the availability level A(6), the user likely is highly available to receive and respond to additional messages received through the messaging service 62 from other subscribers to the messaging service 62. Similarly, if the user has not used the device 4 for a predetermined period of time, such as might correspond with the availability level A(1), the user may be unlikely to respond to messages sent through the messaging service 62. If another subscriber is considering sending a message to the aforementioned user, the subscriber may consult the availability data provided to him regarding the user in order to gauge the likelihood that the user will be available for and be able to respond to a message through the messaging service 62. If the subscriber sees that the other user's availability is low, the subscriber may refrain from sending a message to the user on the assumption that the user would not respond to such a message. This would save the subscriber from wasted time and effort and would also save wasted usage of transmission bandwidth on the messaging service 62. The protocol described herein thus provides a plurality of levels of availability that are based at least in part upon the activity status of a device 4 and that provide to other subscribers an understanding of the potential for a user of the device 4 to respond to messages sent through the messaging service 62.

As suggested above, a plurality of nonavailability levels can be provided. The nonavailability level "suspend" might be used to refer to a situation in which a telephone event such as a telephone call is occurring on the device 4. In such a circumstance, the subscribers to the messaging service 62 would understand that the user of the device 4 on which the telephone event is occurring is temporarily not available but likely will be available as soon as the telephone call is ended. The nonavailability level "offline" might indicate to subscribers that the user of the device 4 has affirmatively terminated his or her availability, and that substantially no present possibility exists of the user receiving or responding to a message from a subscriber. The nonavailability level "unavailable" might indicate that the user of the device 4 is presently not available, but that the reason for such nonavailability is not specifically known, and that the user potentially could become available again at any time. The protocol described herein thus also provides a plurality of descriptive levels of nonavailability that provide to other subscribers an understanding of the potential for an availability of a user of a device to go from nonavailable to available.

Numerous different activity statuses of the device 4 can be employed in determining an availability status for the device 4. Certain specific activities on the device 4 can trigger the generation of a specific availability level for transmission to the other subscribers to the messaging service 62. Certain other activities can cause the current availability level to be altered by a specific degree, i.e., by increasing or decreasing the current availability level to a predetermined extent. An exemplary set of activities on the device 4 and their corresponding exemplary results on the availability level of the device 4 are provided in Table 2. It is noted that a listed result such as "A(−1)" means that the current activity level is to be dropped by one level. A listed result such as "A(1)" means that the activity level is to be changed from whatever is its current value to a value of A(1). It is noted that Table 2 is not intended to be exhaustive, and that numerous other activities and other results can be provided.

TABLE 2

| Activity | Result on Availability Level |
|---|---|
| Device stays in holder for 10 minutes | A(−1) |
| Device stays in holder for 3 minutes with new messages not being read. | A(−1) |
| Profile changes from alert mode to quiet mode | A(−2) |
| Handheld receives a phone call | Suspend |
| Handheld places a phone call | Suspend |
| Compose an email to me | A(6) provided to me A(5) provided to everybody else |
| Compose an email to somebody else | A(5) |
| Compose an Instant message to me | A(6) |
| Compose an Instant Message to somebody else | A(6) |
| Turn off radio | Unavailable |
| Turn on radio | A(1) |
| Auto shut-off | Unavailable |
| Auto power on | A(1) |
| Manual power on | A(4) |
| Appointment in Calendar | A(−2) |
| Meeting in calendar (with other attendees) | A(−4) |
| Turn off cell phone | A(−4) |
| Send/receive a Data Call | Suspend for 5 minutes |
| Radio turned off due to low battery | Unavailable |

TABLE 2-continued

| Activity | Result on Availability Level |
|---|---|
| Read a received email, or SMS | A(+1), max A(5) |
| Read a received IM | A(6) |

From the activity in Table 2 "compose an email to me", it can be seen that the intended recipient of the email, i.e., "me", will receive an availability level of A(6) for the user composing the email, and the other subscribers will receive an availability level of A(5) for the user composing the email. This indicates that the availability level can be tailored to specific subscribers to the messaging service 62 in specific circumstances. It is understood that the designation "IM" employed in the instant application refers generally to the expression "instant message" and variations thereof, and is generally intended to refer to the messaging service 62 or to a data transmission provided on the messaging service 62, although the designation "IM" is not intended to limit the teachings herein strictly to an instant messaging environment, and the teachings rather can be applied in a variety of messaging environment.

Figures 4, 5:
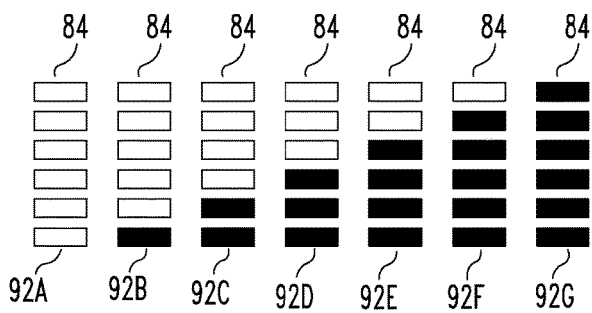
FIG. 4 is an exemplary view of an output provided in accordance with the method of the invention in the messaging environment.
FIG. 5 is an exemplary view of an alternate icon that can be provided as part of the output.

As can be seen in FIG. 4, a subscriber to the messaging service 62 may see, for example, the output 78 provided by the user interface 76 on his device 104. For instance, the subscriber who is the user of the second device 104 may see the output 78, and the output 78 would include an indication of the various availability levels of the various other users with whom the user of the device 104 has already established an electronic relationship, such as the user of the first device 4. The exemplary output 78 includes a listing of contacts 80, i.e., the other subscribers with whom an electronic relationship has already been established, as well as an indication of the level of availability of each contact 80. In the present example, the indication of the level of availability is provided both by an availability icon 84 and by a string value 96. Each of the exemplary availability icons 84 in FIG. 4 is a descriptive icon 88, meaning that it provides a general depiction of the availability of the user as determined by the specific activity status on the corresponding device. The corresponding exemplary string value 96 is depicted herein as being a linguistic expression that corresponds generally with the descriptive icon 88 and with the activity status of the other user.

The availability of the other subscribers can, however, be expressed in other fashions without departing from the concept of the invention. For instance, FIG. 5 depicts a plurality of availability icons 84 that are variable icons 92A, 92B, 92C, 92D, 92E, 92F, and 92G. The variable icons 92A, 92B, 92C, 92D, 92E, 92F, and 92G are depicted as each including a set of bars that either are filled in or are empty in a variable or graduated fashion depending upon the availability level. For instance, the variable icon 92A may correspond with activity level of nonavailable, the variable icon 92B may correspond with the activity level A(1), and so forth through the variable icon 92G which may correspond with the activity level A(6). Numerous other types of variable icons can be employed, such as icons that are lit at varying levels of brightness, that depict a water glass as gradually becoming more full with or less full of a liquid, and the like. Such variable icons 92A, 92B, 92C, 92D, 92E, 92F, and 92G can be employed, for instance, in the place of either or both of the descriptive icons 88 and the string values 96. It is noted that all of the availability icons 84 and string values 96 are stepped indications representative of predetermined stepped availability levels. Other ways of presenting availability information can be employed without departing from the concept of the invention.

As can be understood, the availability data may, for instance, be sent from one device to another at particular times, rather than being continuously updated. For instance, the availability data may be sent only after an expiration of a predetermined duration of time, such as ten minutes, for example. Such periodic transfer of availability data will save transmission bandwidth while providing availability data that is generally up to date. Alternative, or in addition thereto, the availability data concerning a device 4, 104 may be transmitted more or less immediately upon the occurrence of a predetermined event on the device 4, 104, such as the occurrence of a telephone event on the device 4, 104, or such as the occurrence of an event that would affect the wireless capability of the device 4, 104 such as from a powering off of the device 4, 104 or a logging out by the user from the client 60 or the messaging service 62.

The availability data provided by the protocol and method presented herein typically is generated and transmitted automatically, i.e., without a need for an affirmative action by the user to select an availability level or an activity status. This is particularly useful in the environment of a handheld electronic device 4, 104 because, for instance, a person receiving a telephone call on the handheld electronic device 4, 104 typically will be unable at that moment to manually change an availability level. Specifically, a person receiving a telephone call likely will want to accept the telephone call without manually changing an availability level.

It is also noted that the determination of an availability of a device 4, 104 can be incorporated with other data stored on the device 4, 104 or available to the device 4, 104. For instance, a device 4, 104 may include a calendar function that stores meetings and the like. Upon determining, for instance, that a meeting is scheduled to begin at a specific time, and upon detecting that the specific time has occurred, the device 4, 104 may generate a resultant availability level that is relatively low or is a level of unavailability based upon the user being in the scheduled meeting. The resultant availability level potentially could be tailored by the user depending upon, for instance, the importance of the meeting and/or the need to not be interrupted during the meeting. Other uses will be apparent.

The protocol described herein can be employed in various messaging environments, such as instant messaging environments and other messaging environments, as well as, for instance, messaging environments that employ or could usefully employ presence information and are generally available in a mixed environment of fixed and portable electronic devices. It is understood, however, that known messaging protocols and messaging services are not currently configured to provide for the transfer of enhancement data which would be representative of the availability of the various subscribers to the messaging services. In accordance with an aspect of the invention, the protocol described herein can be implemented, at least in part, on such preexisting messaging services 62.

As a general matter, enhancement data that is reflective of an availability of a user of a device can be provided between a pair of devices 4, 104 that are subscribers to a known messaging service 62 if the devices 4, 104 are in some fashion capable of sending and/or receiving availability data. Preexisting devices 4, 104 having preexisting clients that are subscribers to preexisting messaging services 62 generally do not have the capability to communicate such availability data; however, it is possible for a preexisting device 4, 104 to have or receive an upgraded client 60, 160, i.e., one that is capable of communication of availability data. Such an upgraded client 60, 160 can be provided in any of a variety of ways, such as by providing it in a download to the device, providing it on a machine readable medium, and in many other fashions. As a general matter, after an upgraded client 60, 160 is loaded onto a preexisting device 4, 104 on a preexisting messaging service 62, the upgraded client 60, 160 will begin to try to determine which of the other clients 60, 160 with which an electronic relationship has already been established are also upgraded clients 60, 160 capable of communication of availability data.

Figure 6:
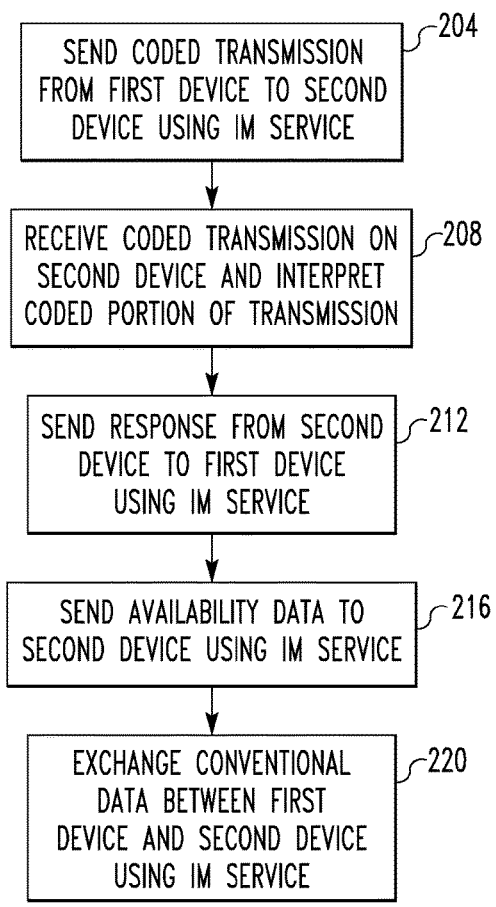
FIG. 6 is an exemplary flowchart of a portion of an improved method related to the devices of FIG. 3.
Figure 7:
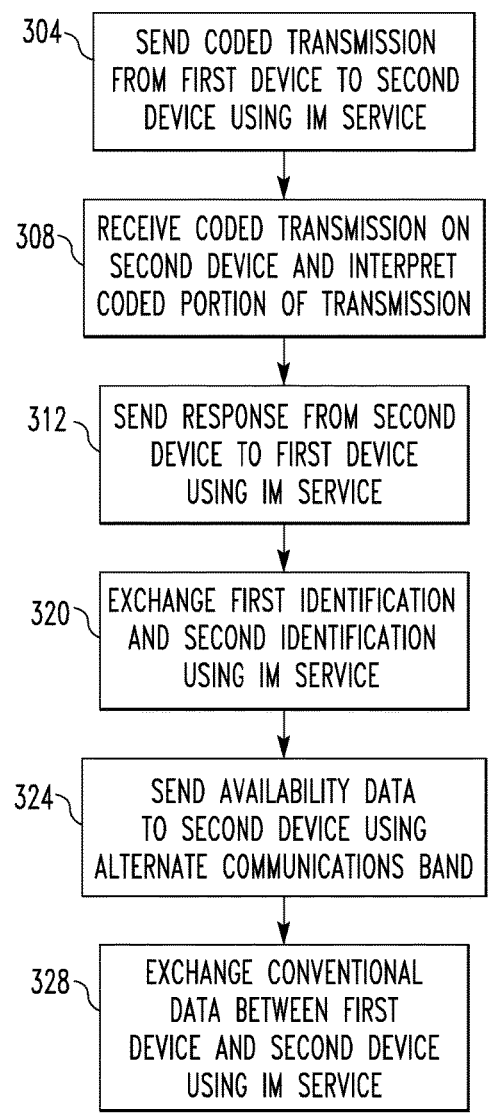
FIG. 7 is another exemplary flowchart of a portion of another improved method related to the device of FIG. 3.

FIGS. 6 and 7 depict flowcharts that set forth the exemplary ways in which the methods of providing availability data set forth herein can be implemented, i.e., bootstrapped, into a preexisting messaging service 62 which, by way of example herein, is an instant messaging service 62. A first method of providing the new protocol and methods described herein on a preexisting messaging service 62 is depicted in FIG. 6.

Once the upgraded client 60, 160 has been loaded onto a preexisting first device 4, such as was mentioned above, the upgraded client 60, 160 then sends a coded transmission, as at 204, via the preexisting messaging service 62 to a second preexisting device 104 having a client 60, 160 on the preexisting messaging service 62. In this regard, the message could be coded to include, for example, special characters or specially formatted white space, i.e., spaces and tabs, that can be transmitted over the communications band of the preexisting messaging service 62. The coding may be such that an upgraded client 60, 160, such as one capable of sending and/or receiving availability data, on the second device 104 would recognize the coding as an invitation from the client 60, 160 on the first device 4 to enter into an electronic negotiation for the transmission of activity data between the first device 4 and the second device 104. The coding may also be such that a non-upgraded client 60, 160, such as one that is not capable of sending and/or receiving availability data, would simply ignore the coding.

In the present example, however, it is assumed that upon receiving the message on the second device 104, as at 208, the client 60, 160 thereon is an upgraded client 60, 160 that is capable of interpreting the coded portion of the message as an invitation from the first device 4 to enter into a negotiation with the first device 4. The client 60, 160 on the second device 104 then sends, as at 212, a response to the first device 4 using the preexisting messaging service 62 to indicate that the second device 104 includes a client 60. 160 capable of handling availability data, and the upgraded clients 60, 160 on the first and second devices 4 and 104 enter into a negotiation as to how availability data will be transmitted therebetween. For instance, the negotiation may determine that the availability data is to be sent over the preexisting messaging service 62 between the first and second devices 4 and 104 in a specific coded fashion or in any of a variety of other fashions.

The first device 4 then sends, as at 216, a signal representative of availability data over the preexisting messaging service 62 to the second device 104. The first and second devices 4 and 104 also exchange, as at 220, conventional data over the preexisting messaging service 62, if such a communication is desired. It thus can be seen that by enabling an upgraded client 60, 160 to use a preexisting messaging service 62 to locate other upgraded clients 60, 160, the upgraded clients 60, 160 can exchange availability data over the preexisting messaging service 62 in addition to exchanging conventional data such as messages over the same preexisting messaging service 62.

Another method of providing the new protocol described herein on a preexisting messaging service 62 is depicted in FIG. 7. The method of FIG. 7 is similar to the method of FIG. 6, except that the availability data is shown in FIG. 7 as being communicated between the first and second devices 4 and 104 via an alternate communications band 72 (FIG. 3), which can be any communications band other than the communications band of the preexisting messaging service 62.

Specifically, a coded transmission is sent, as at 304, via the preexisting message service 62 from the upgraded client on the first device 4 to the upgraded client 60, 160 on the second device 104. The coded transmission is received on the second device 104, as at 308, and is interpreted by the upgraded client 60, 160 thereon. The second device 104 then sends, as at 312, a response via the preexisting message service to the first device 4 requesting a negotiation.

At 320, however, the first device 4 and the second device 104 exchange alternate identifications for the purpose of identifying an alternate communications band 72 and for identifying the first device 4 and the second device 104 on the alternate communications band 72. Specifically, the first device 4 transmits one or more first identifications to the second device 104, and the second device 104 transmits one or more second identifications to the first device 4. The first and second identifications can be, for example, telephone numbers, IP addresses, PINs, e-mail address, instant messaging user-IDs, and the like that would identify the first device 4 and the second device 104, respectively, on another network such as a telephone network, a global communications network, private or public messaging network, or other network on an alternate communications band 72 on which the first device 4 and the second device 104 are capable of communication with one another.

Upon performing the negotiation, in which an alternate communications band 72 is selected between the first and second devices 4 and 104, the availability data is sent, as at 324, between the first and second devices 4 and 104 over the alternate communications band. Conventional data can then be exchanged, as at 328, over the preexisting messaging service if such communication of data, such as a message, is desired.

The protocol and methods of exchanging availability data set forth herein thus advantageously can be implemented onto a preexisting messaging services 62. As set forth above, the availability data can be sent periodically, such as upon the occurrence of a predetermined event or an expiration of a predetermined duration of time, or otherwise. Of course, a new messaging service 62 could be established that provides the protocol herein for the communication of availability data between devices.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A non-transitory computer readable medium comprising wireless device processor executable instructions, which when executed by a wireless device processor effects a messaging service client, the messaging service client being configured to selectively transmit messages to a plurality of associated messaging clients via a messaging service and receive messages from the plurality of associated messaging clients via the messaging service, the instructions comprising instructions for:
  displaying, on a user interface display of the messaging service client, a first icon indicative of a delivery status upon receiving, via the messaging service, a first data indicative of the delivery status of a message transmitted to at least one of the associated messaging clients;
  displaying, on the user interface display while displaying the first icon, a second icon indicative of the delivery status upon receiving, via the message service, a second data indicative of the delivery status of the message transmitted to the at least one associated messaging client, the second data indicative of the delivery status being different from the first data indicative of the delivery status;
  automatically receiving, via the messaging service, a third data indicative of a reported activity status of a user of the at least one associated messaging client, the third data corresponding to an availability of the user of the at least one associated messaging client; and
  displaying, on the user interface display while displaying the first icon and the second icon, at least one indication that is separate from the first and second icons and indicating the corresponding availability of the user of the at least one associated messaging client,
  wherein the at least one indication represents:
  that the at least one associated messaging client is idle and
  a representation of time since the at least one associated messaging client has sent a message.

2. The non-transitory computer readable medium of claim 1, wherein the first icon includes a check mark.

3. The non-transitory computer readable medium of claim 1, wherein at least one of the first icon and the second icon include a check mark and the at least one indication indicates whether the user of the at least one associated messaging client is typing.

4. The non-transitory computer readable medium of claim 1, wherein the at least one indication corresponds to a user selectable status.

5. The non-transitory computer readable medium of claim 1, wherein the at least one indication includes the word typing.

6. The non-transitory computer readable medium of claim 1, further comprising instructions for subscribing to the messaging service.

7. The non-transitory computer readable medium of claim 1, wherein the second data is transmitted automatically by the at least one associated messaging client.

8. The non-transitory computer readable medium of claim 1, wherein a user of the messaging service client and a user of the at least one associated messaging client are subscribers of the messaging service.

9. The non-transitory computer readable medium of claim 1, wherein the first data is transmitted from a server of the messaging service.

10. The computer readable medium of claim 1, further comprising instructions for receiving a message from the at least one associated messaging client and transmitting a tenth data indicative of the delivery status of the received message.

11. The non-transitory computer readable medium of claim 10, wherein the tenth data is transmitted automatically responsive to receiving the message.

12. The non-transitory computer readable medium of claim 1, wherein the instructions further comprise instructions for:
  displaying a third icon indicative of a delivery status upon receiving, via the messaging service, a fourth data indicative of the delivery status of a message transmitted to at least one other of the associated messaging clients;
  displaying a fourth icon indicative of the delivery status upon receiving, via the message service, a fifth data indicative of the delivery status of the message transmitted to the at least one other associated messaging client, wherein the fifth data indicative of the delivery status is different from the fourth data indicative of the delivery status; and
  displaying a second indication separate from the first, second, third and fourth icons and indication upon receiving, via the messaging service, a sixth data indicative of an activity status of a user of the at least one other associated messaging client,
  wherein the third and fourth icons and second indication represent a potential for the user of the at least one other associated message client to respond to messages sent through the messaging service.

13. The non-transitory computer readable medium of claim 12, wherein the instructions further comprise instructions for:
  displaying a fifth icon indicative of a delivery status upon receiving, via the messaging service, a seventh data indicative of the delivery status of a message transmitted to at least one second other of the associated messaging clients;
  displaying a sixth icon indicative of the delivery status upon receiving, via the message service, an eighth data indicative of the delivery status of the message transmitted to the at least one second other associated messaging client, wherein the seventh data indicative of the delivery status is different from the eighth data indicative of the delivery status; and
  displaying a third indication separate from the first, second, third fourth, fifth, and sixth icons and indication and second indication upon receiving, via the messaging service, an ninth data indicative of an activity status of a user of the at least one second other associated messaging client,
  wherein the fifth and sixth icons and second indication represent a potential for the user of the at least one second other associated message client to respond to messages sent through the messaging service.

14. A non-transitory computer readable medium comprising wireless device processor executable instructions, which when executed by a wireless device processor effects a messaging service client, wherein the messaging service client selectively transmits messages to a plurality of associated messaging clients via a messaging service, the instructions comprising instructions for:
  displaying, on a user interface display, a first icon indicative of a first delivery status upon receiving, via the messaging service, a first data indicative of the first delivery status of a message transmitted to a first associated messaging client;
  displaying, on the user interface display while displaying the first icon, a second icon indicative of a second delivery status upon receiving, via the message service, a second data indicative of the second delivery status of a message transmitted to a second associated messaging client;

automatically receiving, via the messaging service, a third data indicative of a reported activity status of a user of the at least one associated messaging client, the third data corresponding to an availability of the user of the at least one associated messaging client; and displaying, on the user interface display while displaying the first icon and the second icon, at least one indication that is separate from the first and second icons and indicating the corresponding availability of the user of the at least one associated messaging client, wherein the at least one indication represents a representation of time since the at least one associated messaging client has sent a message.

15. The non-transitory computer readable medium of claim 14, wherein the first icon is displayed in conjunction with information identifying a user of the first associated messaging client.

16. The non-transitory computer readable medium of claim 14, wherein the first and second icons and indication represent a potential for the first, second, and third users of the first, second, and third associated message clients to respond to messages sent through the messaging service.

17. A non-transitory computer readable medium comprising wireless device processor executable instructions, which when executed by a wireless device processor effects a messaging service client, wherein the messaging service client selectively transmits messages to a plurality of associated messaging clients via a messaging service, the instructions comprising instructions for:

displaying, on a user interface display, information identifying a plurality of users corresponding to a plurality of the associated messaging clients, wherein the plurality of users are identified by determining which of the plurality of users are in an existing listing of contacts are subscribers to the messaging service;

displaying, on the user interface display while displaying the information, a first icon indicative of a delivery status upon receiving, via the messaging service, a first data indicative of the delivery status of a message transmitted to at least one of the associated messaging clients;

automatically receiving, via the messaging service, a third data indicative of a reported activity status of a user of the at least one associated messaging client, the third data corresponding to an availability of the user of the at least one associated messaging client; and displaying, on the user interface display while displaying the information and the first icon, at least one indication that is separate from the first and second icons and indicating the corresponding availability of the user of the at least one associated messaging client, wherein the at least one indication represents:

that the at least one associated messaging client is idle and a representation of time since the at least one associated messaging client has sent a message.

18. The non-transitory computer readable medium of claim 17 further comprising instructions for determining the plurality of users.

19. The non-transitory computer readable medium of claim 17, wherein the plurality of users corresponding to the plurality of the associated messaging clients are determined automatically after the messaging service client is installed on the wireless device.

20. The non-transitory computer readable medium of claim 17, wherein the first icon is displayed in conjunction with information identifying the user of at least one of the associated other messaging client.

21. The non-transitory computer readable medium of claim 17, wherein the first icon and indication are displayed on the wireless device.

22. The non-transitory computer readable medium of claim 17, wherein the first icon is indicative of the message being delivered to the at least one of the associated messaging clients.

23. The non-transitory computer readable medium of claim 22, wherein the first icon is indicative of the message being read using the at least one of the associated messaging clients.

* * * * *